Jan. 3, 1961 R. J. GRAY 2,967,016
COURSE COMPUTER FOR NAVIGATORS
Filed March 4, 1957 2 Sheets-Sheet 1

INVENTOR.
ROBERT JOHN GRAY
BY
ATTORNEY

Jan. 3, 1961 R. J. GRAY 2,967,016
COURSE COMPUTER FOR NAVIGATORS
Filed March 4, 1957 2 Sheets-Sheet 2

INVENTOR.
ROBERT JOHN GRAY
BY
ATTORNEY

United States Patent Office 2,967,016
Patented Jan. 3, 1961

2,967,016

COURSE COMPUTER FOR NAVIGATORS

Robert John Gray, 48 Stuyvesant St., New York, N.Y.

Filed Mar. 4, 1957, Ser. No. 643,585

2 Claims. (Cl. 235—61)

This invention relates to a device for aiding in navigation, by facilitating computation of one's course from true to compass, and vice versa.

The navigational instrument constituting the present invention is designed to eliminate or reduce materially the necessity of making mathematical computations, during navigation of a ship. Such mathematical computations require considerable time and difficulty, and raise the possibility of human error.

In accordance with the present invention, a simply designed device is comprised of three relatively rotatable members having a common axis, so designed that when used upon a chart, one may swiftly compute a course from true to compass and vice versa, with means being provided for automatically compensating for magnetic deviation and magnetic variation errors.

Another object is to provide, in a device of the character stated, means for swiftly converting speed and time readings into distance readings, so that on computation of the course, one may ascertain the distance that must be traveled to reach a particular point on said course in a given amount of time. Or, given the distance, one may readily ascertain by use of the means provided upon the device, the hours involved in traveling said distance with the ship operating at a predetermined speed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figs. 1 and 1A together form a top plan view of a course computer according to the present invention, a portion of the swingable arm being broken away.

Figure 4:
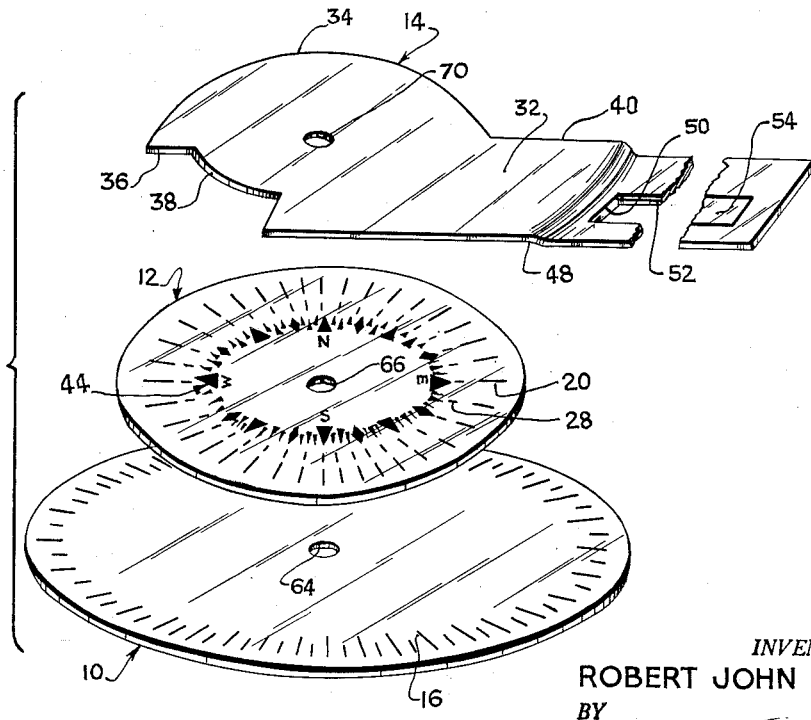
Fig. 4 is an exploded perspective view of the device, a portion of the arm being broken away.

Referring to the drawings in detail, as will be noted from Fig. 4, the device constituting the present invention includes three main components, these being a bottom disc 10, an intermediate disc 12, and a rotatable arm generally designated 14 which includes an upper disc and an elongated, straight arm member.

Figure 1:
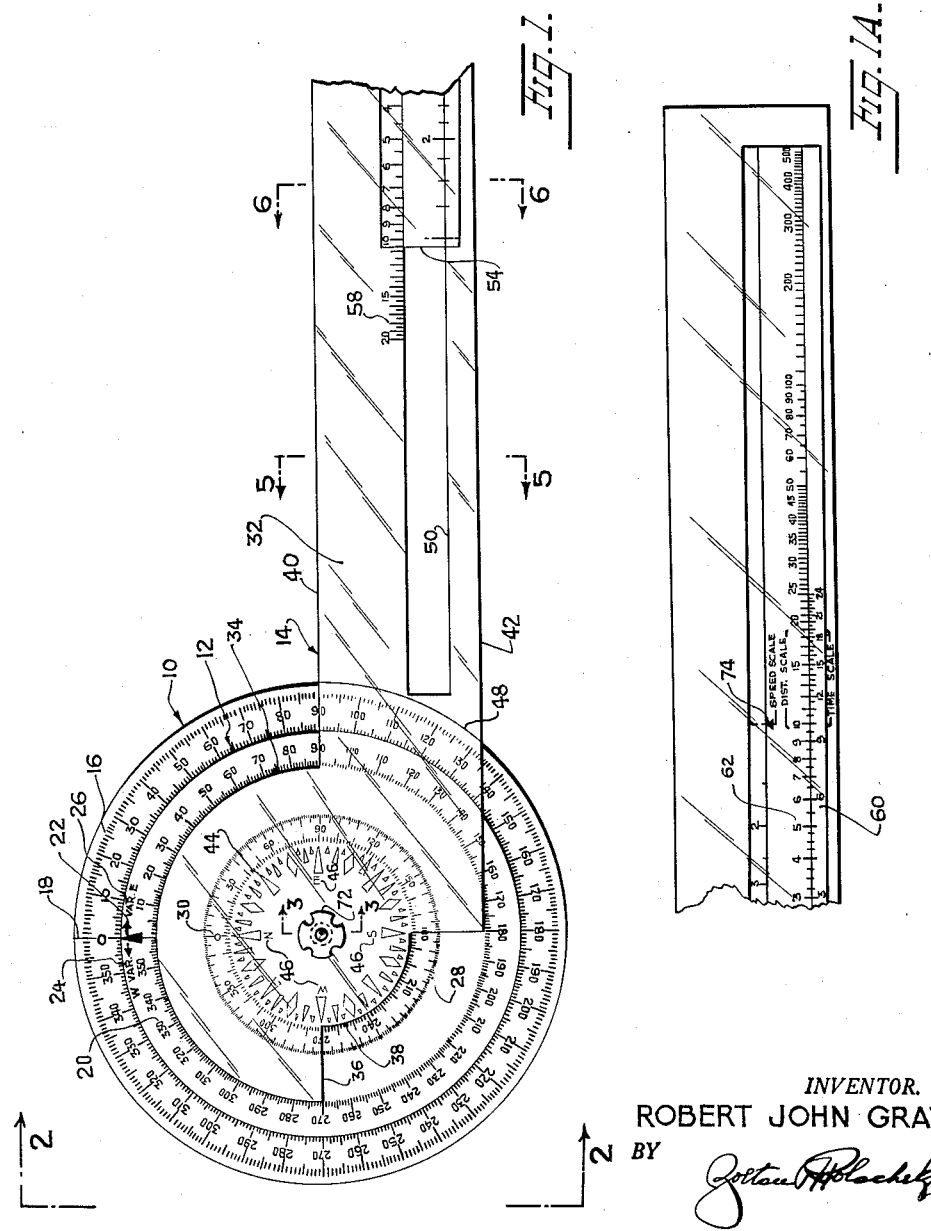
Figure 2:
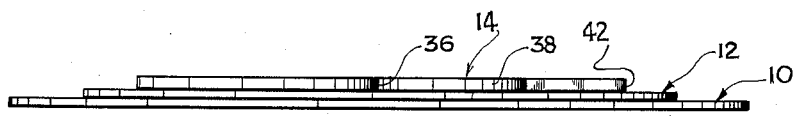
Fig. 2 is an edge elevational view of the device as seen from the line 2—2 of Fig. 1.
Figure 5:
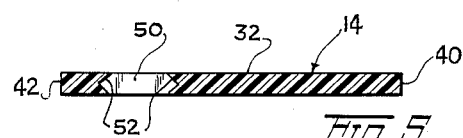
Fig. 5 is a transverse sectional view on line 5—5 of Fig. 1.

As shown in Fig. 1, the bottom disc 10, at its margin, has a compass rose 16. Compass rose 16 may appropriately be termed an outer compass rose, and as shown in Fig. 1, is marked off in degrees, through a full 360° beginning with a zero marking 18. Main indicia such as "10," "20" are provided every ten degrees, and between said main indicia markings are provided each designating one degree.

The outer disc 10 is the greatest in diameter of the three discs. The intermediate 12 is somewhat smaller in diameter than the outer disc, so that the outer compass rose 16 is exposed beyond the periphery of the intermediate disc. On the margin of the intermediate disc there is a compass rose 20, which will be termed a middle or intermediate compass rose. This is also marked off in degrees, through a full 360°, in main units of ten degrees, with markings being provided between the main units each designating one degree. The middle compass rose 20 begins with an index marking 22, at opposite sides of which are indicia 24, 26, respectively indicating variations to west and east.

The intermediate disc 12 also has an inner compass rose 28, disposed inwardly from the intermediate rose 20, as best shown in Figs. 1 and 4. The compass rose 28 is also marked off through a full 360°, beginning with a zero marking 30, the rows descending in value clockwise from the zero marking in main units of thirty degrees each, with individual degree markings being provided between the main units. Inside of the compass rose 28 there is a quarter point card 44 to convert the degrees into the thirty-two points, each point being 11¼° and includes at ninety degree intervals indicia 46 designating the main points of a compass.

Referring now to the rotatable arm 14, this includes, as previously noted, an elongated arm member 32, which is integral at one end with an upper disc 34, the diameter of which is smaller than the diameter of the intermediate disc 12, to an extent sufficient to expose the intermediate compass rose 20 beyond a periphery of the upper disc, as shown in Fig. 1. The upper disc is transparent so that the inner compass rose 28 and the quarter point card may be observed through the material of the upper disc 34.

As will be noted, the upper disc 34 has a marginal recess 36 extending through ninety degrees of the circumference of the upper disc, said recess having an inner edge 38 concentric with the several discs and offset inwardly from the periphery of the upper disc a distance sufficient to expose within recess 36 the inner compass rose 28.

The arm member 32 has straight longitudinal edges 40, 42 which are parallel to each other. Edge 40 is extended as a radius of disc 34, while edge 42 is in continuation of a line tangential to disc 34, that is, the width of the arm member 32 is equal to the radius of the disc 34. Edge 42 extends to and is perpendicular to one of the end walls of the recess 36.

Arm 32, as shown in Fig. 4, may be and preferably is formed with an offset 48 spaced a short distance from the periphery of the upper disc 34, and extending along a curved line transversely of the arm member concentric with and disposed outwardly a short distance from the periphery of the disc 10. This is to permit that portion of the arm member that is disposed beyond the periphery of disc 10 to have its underside coplanar with the underside of the disc 10, so that the arm member will lie flat upon a chart or work table. Other means may be employed for supporting the arm member 32 in direct contact with the work table even though it is the uppermost of the three components, as for example lugs might be formed upon the underside of the arm member 32, without an offset 48 being formed therein, said lugs contacting the chart. The arrangement illustrated and described, however, has the advantage that the arm member 32, when laid flat against the chart, may be registered with maximum accuracy with selected points on the chart, not shown.

As shown in Figs. 1, 1A, 5 and 6, formed in the arm member 32, over substantially the full length thereof, is a closed longitudinal slot 50, disposed in closely spaced relation to the edge 42 of the arm member. The slot 50 has undercut side walls 52 (Figs. 5 and 6), and an elongated slide 54 is engaged in the slot, with the opposite longitudinal edges of the slide being complementary to and engaging in the undercut side walls of the slot 50.

Marked upon the arm member 32, along the top edge of the slot 50, is a scale 58 calibrated to show speed in terms of knots. The speed scale 58 is opposite a time scale 60 marked upon the arm member 32 along the opposite edge of the slot 50, and calibrated in hours and fractions thereof.

On slide 54 there is provided a distance scale 62, marked off in nautical miles.

Figure 3:
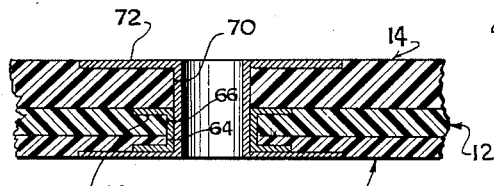
Fig. 3 is an enlarged, detail sectional view substantially on line 3—3 of Fig. 1, showing the rotatable connection of the several components.
Figure 6:
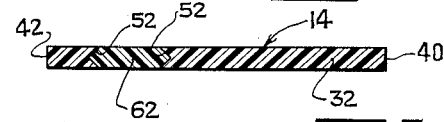
Fig. 6 is a transverse sectional view on line 6—6 of Fig. 1.

The three main components of the device are connected for relative rotation, and it is desirable that the connection be such that the arm 14 have a freedom of rotation relative to the discs 10, 12 which is greater than the freedom of relative rotatable movement of the disc 10 relative to disc 12 and vice versa. In other words, it is not desirable that a single pivot be used to connect all three members 10, 12, 14 for relative rotation, since obviously this would only result in each of the rotatable components being movable relative to the others with the same freedom that each of the others is similarly movable. By the arrangement illustrated in Fig. 3, the members 10, 12 may be clamped together for relative rotation in a manner such as to frictionally bind these components in face-to-face contact, so that there will not be complete freedom of relative rotatable movement, and so that, further, in each position to which one of these discs is moved relative to the other, it will be securely held against accidental movement by frictional engagement of the discs with each other.

The arm 14, however, should be freely swingable, since it will be designed to be swung rapidly and easily to selected positions, with the swinging of the arm taking place frequently during the computation of the course.

Accordingly, center openings 64, 66 of equal diameter are formed in the discs 10, 12, respectively (Fig. 3), and extending through said openings is a rivet 68 flanged at its opposite ends and recessed at its flanged ends in the outer faces of the discs 10, 12. The rivet connects the discs 10, 12 for relative rotation, and holds them together with a tightness such as to cause them to frictionally grip each other in selected positions of relative rotatable adjustment.

In the arm 14 a center opening 70 is formed, centrally of the disc 34. This is of a diameter slightly less than the diameter of the openings 64, 66. The diameter of opening 70 is equal to the inner diameter of the rivet 68. A main rivet 72 is now extended through opening 70 and through the rivet 68, and is flanged at its opposite ends, the flanged ends of the rivet 70 being recessed in the outer faces of the discs 10 and arm 14 so as to be flush with said outer faces. The rivet 72 is designed to permit free rotational movement of the arm 14 upon the discs 10, 12.

In use of the device, as a first step one draws on disc 12 the known compass deviation in the annular area provided between the middle rose 20 and the inner rose 28, every five degrees from zero to 360 degrees. Then, one ascertains the magnetic error variation from the navigational chart, not shown, and sets the rose 20 to this variation with respect to rose 16 on the device. Then, the center point of the pivotal connection 72 of the discs 10, 12 and arm 14 is placed upon the known ship's position, which is already fixed upon the chart.

Thereafter, the rotatable arm 14 is located through the center of the chart's true course rose 16 and one lines up the true course rose 16 of the course computer to read the same degrees as the chart's true course rose 16 on the rotatable arm 14.

After locating the course computer on the chart one obtains the true bearing with the rotatable arm 14 simply by pointing it in the direction of the ship's destination. The rotatable arm will then automatically provide the true, variation, and compass bearing.

To operate the slide means of arm member 32, one determines the distance as run in a given amount of time, and locates index marking 74 (Fig. 1A), provided upon the slide 54, in registration with the indicium of scale 58 that designates the speed at which the ship is to travel. Then, the distance is read on the distance of the scale, above the appropriate or given number of hours.

To determine the average amount of knots in a given amount of distance, one moves the distance scale with the distance run, over to the amount of time it took to cover the distance. Then, the average number of knots is read, as designated by the index 74 on the speed scale.

It becomes apparent that with the device, one is enabled to make course computations with maximum speed and ease, and without the necessity of extensive mathematical computations, which as previously noted raised the possibility of human error and in addition represented a considerable inconvenience and loss of time.

Preferably, all three of the components would be formed from plastic material, which will be transparent in a preferred embodiment. This will permit full visibility of the chart on which the device is placed.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A course computer comprising a main disc, an intermediate disc, and an elongated rectangular arm, all in juxtaposed relation and connected for relative rotary adjustment, the main disc being of a diameter greater than that of the intermediate disc and marked with a compass rose, the rose of the main disc being exposed beyond the periphery of the intermediate disc, the main disc including a single rose, the intermediate disc including a pair of outer and inner concentric roses and a quarter point card, the arm being formed with an upper disc concentric with the main and intermediate discs, the arm member extending outwardly from the upper disc, a pivot for said main and intermediate discs in the center of the upper disc of the arm, said upper disc having a circumferential recess extending through ninety degrees of its circumference, the arm having one longitudinal edge extending radially and the other tangentially of the upper disc, the upper disc having a circumferential recess extending through ninety degrees of its circumference exposing the inner rose of the intermediate disc.

2. A course computer comprising an elongated substantially rectangular transparent member adapted to be laid on a navigation chart so that the check-point on the chart may be seen therethrough, a disc constituting one end of said member with one long edge of the member extending through the axial center of the disc when said line is projected, and with the other long edge of the member extending tangentially of the disc, a rotatable disc juxtaposed to said end disc, said rotatable disc being greater in diameter than the end disc, a second rotatable disc juxtaposed to said first rotatable disc, said second rotatable disc being greater in diameter than the first rotatable disc, said first rotatable disc having an outer rose and an inner rose concentrically arranged with the outer rose and having a quarter-point card inwardly of the inner rose, said second rotatable disc having a rose adjacent its periphery outwardly of the periphery of the first rotatable disc, concentric with the other roses, and a pivot for said rotatable discs in the center of the end disc on said rectangular member, the disc on the end of the rectangular member having a recess exposing the inner rose of the first rotatable disc.

References Cited in the file of this patent

UNITED STATES PATENTS

| | | | |
|---|---|---|---|
| 697,861 | MacCollin | Apr. 15, | 1902 |
| 777,508 | Hubbard | Dec. 13, | 1904 |
| 1,113,717 | Thayer | Oct. 13, | 1914 |
| 1,985,907 | Weems | Jan. 1, | 1935 |
| 2,150,442 | Herzog | Mar. 14, | 1939 |
| 2,239,959 | Gray | Apr. 29, | 1941 |
| 2,244,125 | Siefker | June 3, | 1941 |
| 2,299,444 | Warner | Oct. 20, | 1942 |
| 2,345,020 | Warner | Mar. 28, | 1944 |
| 2,517,264 | Wake | Aug. 1, | 1950 |
| 2,545,935 | Warner | Mar. 20, | 1951 |